US012369532B2

(12) United States Patent
Larkins (10) Patent No.: US 12,369,532 B2
(45) Date of Patent: *Jul. 29, 2025

(54) SYSTEM FOR HANG HARVESTING VEGETATION

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,070

(22) Filed: Sep. 26, 2023

(65) Prior Publication Data

US 2024/0016097 A1    Jan. 18, 2024

Related U.S. Application Data

(63) Continuation of application No. 17/691,462, filed on Mar. 10, 2022, now Pat. No. 11,765,996.
(Continued)

(51) Int. Cl.
*A01F 25/12* (2006.01)
*A47B 47/00* (2006.01)
(Continued)

(52) U.S. Cl.
CPC .......... *A01F 25/12* (2013.01); *A47B 47/0083* (2013.01); *A47B 47/0091* (2013.01); *A47B 47/027* (2013.01); *A47B 87/0207* (2013.01)

(58) Field of Classification Search
CPC ....... A01F 25/12; D06F 57/06; A22C 15/007; A47B 47/0083; A47B 47/0091; A47B 47/027; A47B 87/0207; A47B 87/0215; A47B 87/0253; A47B 87/0269; A47B 47/028; A47B 47/0223
(Continued)

(56) References Cited

U.S. PATENT DOCUMENTS 285,159 A    9/1883   Reynolds
322,330 A    7/1885   Snow
(Continued)

FOREIGN PATENT DOCUMENTS

CA    2458956 A1    9/2004
CN    201533508 U    7/2010
(Continued)

OTHER PUBLICATIONS

Canadian Examination Report issued by the Canadian Patent Office in connection with International Application No. 3,147,595, dated May 6, 2024.
(Continued)

*Primary Examiner* — Jennifer E. Novosad
(74) *Attorney, Agent, or Firm* — George Likourezos; Carter, DeLuca & Farrell LLP (57) ABSTRACT

A hang harvesting system includes a plurality of stackable pods each including a platform, and a plurality of support shafts extending vertically from the platform. Each of the support shafts defines a plurality of notches configured for suspending a horizontal bar from the support shafts. Top ends of the support shafts of one pod are configured to support a platform of another pod thereon.

18 Claims, 7 Drawing Sheets

Related U.S. Application Data (60) Provisional application No. 63/161,599, filed on Mar. 16, 2021.

(51) Int. Cl.
*A47B 47/02* (2006.01)
*A47B 87/02* (2006.01)

(58) Field of Classification Search
USPC ................ 211/194, 188, 191, 192, 204, 206
See application file for complete search history.

(56) References Cited

U.S. PATENT DOCUMENTS

| | | | | |
|---|---|---|---|---|
| 395,328 | A * | 1/1889 | Jewell | A47B 57/16 108/110 |
| 531,496 | A | 12/1894 | Barwick | |
| 639,549 | A * | 12/1899 | Fitzgerald | A47B 46/005 211/117 |
| 714,420 | A * | 11/1902 | Wetzel | A01F 25/12 211/124 |
| 906,347 | A * | 12/1908 | Willner | B65H 23/08 211/44 |
| 941,448 | A | 11/1909 | Haglund | |
| 945,729 | A | 1/1910 | Rangnow | |
| 959,685 | A * | 5/1910 | Adlam | A01F 25/12 452/187 |
| 1,089,810 | A | 3/1914 | Bain et al. | |
| 1,274,849 | A * | 8/1918 | Bullerdick | A01F 25/12 211/196 |
| 1,321,997 | A | 11/1919 | Duberstein | |
| 1,383,025 | A | 6/1921 | Reynolds | |
| 1,456,295 | A | 5/1923 | Bain | |
| 1,461,946 | A * | 7/1923 | Sievert | A01F 25/12 211/125 |
| 1,512,052 | A * | 10/1924 | Richardson | A01F 25/12 454/177 |
| 1,515,078 | A | 11/1924 | Sheee | |
| 1,611,397 | A * | 12/1926 | Wells | A01F 25/12 211/113 |
| 1,638,651 | A | 8/1927 | Bain | |
| 1,833,388 | A | 11/1931 | Carmack | |
| 1,868,638 | A * | 7/1932 | Mackey | B61D 45/006 410/152 |
| 2,037,971 | A | 4/1936 | Ferren | |
| 2,099,596 | A | 11/1937 | Bruening | |
| 2,150,869 | A | 3/1939 | Shafarman | |
| 2,279,777 | A | 4/1942 | Dean | |
| 2,289,729 | A | 7/1942 | Robinson et al. | |
| 2,338,290 | A * | 1/1944 | McDonald | A47B 31/00 211/41.1 |
| 2,411,856 | A | 12/1946 | Harding | |
| 2,438,324 | A * | 3/1948 | Pfeffer | D06F 57/06 211/206 |
| 2,451,110 | A * | 10/1948 | Newman | A47B 61/02 211/115 |
| 2,462,431 | A * | 2/1949 | Schneider | C25D 17/08 204/297.06 |
| 2,484,449 | A | 10/1949 | Fetterman | |
| 2,546,929 | A * | 3/1951 | Nampa | B61D 45/006 403/49 |
| 2,574,319 | A * | 11/1951 | Cadwallader | 211/118 |
| 2,577,276 | A * | 12/1951 | Saul, Jr. | A47B 47/027 108/110 |
| 2,580,193 | A | 12/1951 | Richterkessing | |
| 2,586,913 | A | 2/1952 | Burns | |
| 2,634,031 | A | 4/1953 | Klein | |
| 2,643,777 | A * | 6/1953 | Pickens, Sr. | B65G 9/002 211/189 |
| 2,671,938 | A | 3/1954 | Roberts | |
| 2,692,711 | A | 10/1954 | Norris et al. | |
| 2,716,513 | A | 8/1955 | Braunstein | |
| 2,828,897 | A | 4/1958 | Gordon | |
| 2,920,766 | A * | 1/1960 | Geryoldine | A47G 25/0692 211/123 |
| 2,929,514 | A * | 3/1960 | Stewart | A47B 61/02 248/317 |
| 3,011,650 | A * | 12/1961 | Engelhorn | A23B 4/052 452/187 |
| 3,079,003 | A * | 2/1963 | Hilsinger, Jr. | A47J 47/16 248/311.2 |
| 3,129,820 | A * | 4/1964 | Stulman | A22C 15/007 211/117 |
| 3,131,817 | A | 5/1964 | Schenkler | |
| 3,143,370 | A * | 8/1964 | Danford | A24B 1/08 34/239 |
| 3,158,265 | A * | 11/1964 | Thimons | A22C 15/007 248/243 |
| 3,162,417 | A * | 12/1964 | Briggs | A23B 4/052 211/113 |
| 3,194,458 | A | 7/1965 | Bennett | |
| D202,954 | S | 11/1965 | Hanson | |
| 3,346,150 | A | 10/1967 | Clopton | |
| D210,333 | S | 2/1968 | Apy | |
| 3,535,808 | A | 10/1970 | Morrish | |
| 3,580,386 | A | 5/1971 | Arnould | |
| 3,606,948 | A | 9/1971 | Strang | |
| 3,696,939 | A * | 10/1972 | Drowatzky | A22C 15/007 452/187 |
| 3,739,921 | A * | 6/1973 | Schmidt | F16B 7/00 432/261 |
| 3,857,494 | A * | 12/1974 | Giardini | A47B 47/05 108/53.5 |
| 3,874,572 | A | 4/1975 | McClenning | |
| 3,888,533 | A * | 6/1975 | Long | A01D 45/16 294/5.5 |
| D236,572 | S | 9/1975 | Ostroll | |
| 4,316,547 | A * | 2/1982 | Varon | A47G 25/0692 211/124 |
| D264,912 | S | 6/1982 | Bliss et al. | |
| 4,440,369 | A | 4/1984 | Banks | |
| 4,457,239 | A | 7/1984 | Heinze | |
| 4,494,896 | A | 1/1985 | Difranco | |
| 4,703,878 | A | 11/1987 | Louw | |
| 4,717,053 | A | 1/1988 | Wang | |
| 4,724,967 | A | 2/1988 | Valiulis | |
| 4,793,531 | A | 12/1988 | Blanchard et al. | |
| 4,811,853 | A | 3/1989 | Mead | |
| 4,845,602 | A | 7/1989 | Lehocki | |
| 4,881,342 | A | 11/1989 | Ferguson | |
| 5,007,562 | A | 4/1991 | Brink et al. | |
| 5,067,617 | A | 11/1991 | Caldwell et al. | |
| 5,074,445 | A | 12/1991 | Chen | |
| 5,129,524 | A * | 7/1992 | Holman | A47G 19/16 99/321 |
| 5,141,114 | A * | 8/1992 | Cate, Jr. | B65D 19/44 D34/28 |
| D331,425 | S | 12/1992 | Rhyne | |
| 5,168,642 | A * | 12/1992 | Hansen | A01F 25/12 34/239 |
| 5,169,011 | A | 12/1992 | Ebeling et al. | |
| D332,180 | S | 1/1993 | Marshall et al. | |
| D338,575 | S * | 8/1993 | Takaya | D6/682.4 |
| 5,329,728 | A | 7/1994 | Ray | |
| 5,333,409 | A | 8/1994 | Mendes | |
| 5,348,149 | A * | 9/1994 | McCarthy | B65D 19/10 211/49.1 |
| 5,361,949 | A | 11/1994 | Petrou | |
| 5,388,354 | A | 2/1995 | Marshall et al. | |
| D357,813 | S | 5/1995 | Koresko | |
| 5,520,311 | A | 5/1996 | Lam | |
| 5,527,242 | A * | 6/1996 | Gangloff | A63B 21/4045 482/141 |
| 5,535,927 | A | 7/1996 | Garrison | |
| 5,544,765 | A * | 8/1996 | Farbman | A47B 47/00 211/189 |
| 5,581,936 | A | 12/1996 | Belgiorno | |
| 5,647,492 | A | 7/1997 | Fillios et al. | |
| 5,813,092 | A | 9/1998 | Greenfield et al. | |
| 5,826,759 | A | 10/1998 | Ohsugi | |

(56) References Cited

U.S. PATENT DOCUMENTS

| | | | |
|---|---|---|---|
| 5,868,289 A | 2/1999 | Lee | |
| 5,884,422 A | 3/1999 | Marshall et al. | |
| 5,918,750 A | 7/1999 | Jackson | |
| 6,047,867 A | 4/2000 | Heiber | |
| 6,132,305 A | 10/2000 | Witherell | |
| 6,164,466 A * | 12/2000 | Baradat | B62B 3/006 211/186 |
| 6,298,600 B1 | 10/2001 | Feldman | |
| 6,340,238 B1 | 1/2002 | Pan | |
| 6,349,863 B1 | 2/2002 | Frye | |
| 6,375,018 B1 * | 4/2002 | Clement | A47F 7/02 211/85.2 |
| 6,389,744 B1 | 5/2002 | Pugh | |
| 6,641,105 B1 | 11/2003 | Hamerski | |
| 6,659,295 B1 | 12/2003 | De Land et al. | |
| 6,726,041 B2 * | 4/2004 | Dunn | B65D 19/12 206/335 |
| D494,779 S | 8/2004 | Wenger | |
| 6,811,064 B2 | 11/2004 | Salem | |
| 6,817,497 B2 | 11/2004 | Grasso et al. | |
| 6,846,177 B1 | 1/2005 | Hutchens | |
| D502,756 S | 3/2005 | Birdwell et al. | |
| 6,863,197 B1 | 3/2005 | Dirlam et al. | |
| 7,015,815 B1 | 3/2006 | Feibelman | |
| 7,097,051 B2 | 8/2006 | Schober et al. | |
| 7,178,705 B1 | 2/2007 | Sutton | |
| 7,270,236 B2 * | 9/2007 | Angeletti | B65G 49/062 211/195 |
| 7,377,409 B1 | 5/2008 | Brown | |
| D578,778 S | 10/2008 | Laino | |
| 7,533,948 B2 * | 5/2009 | Smith | F25D 25/02 211/187 |
| D605,861 S | 12/2009 | Meadows | |
| 7,681,887 B2 | 3/2010 | Hensley | |
| 7,774,977 B2 | 8/2010 | Miller Shelton | |
| 7,984,585 B1 | 7/2011 | Wu | |
| 7,997,213 B1 * | 8/2011 | Gauthier | B65D 88/022 294/67.1 |
| 8,002,128 B2 * | 8/2011 | Kern | B65D 19/12 211/194 |
| 8,172,099 B1 * | 5/2012 | Hardy | A23G 3/10 211/195 |
| 8,276,714 B2 | 10/2012 | Broyles | |
| D680,757 S | 4/2013 | Hyman | |
| 8,720,704 B2 | 5/2014 | Gupta | |
| D711,123 S | 8/2014 | Birge | |
| 8,905,254 B2 * | 12/2014 | Joubert | B65D 19/12 206/386 |
| 8,955,700 B2 | 2/2015 | Barber et al. | |
| 9,113,736 B1 | 8/2015 | Antler | |
| D772,584 S | 11/2016 | Debus | |
| 9,492,009 B2 | 11/2016 | Naka et al. | |
| 9,782,031 B2 * | 10/2017 | Debus | A47G 25/32 |
| D806,410 S | 1/2018 | Denby et al. | |
| D853,737 S | 7/2019 | Wolfe | |
| D867,770 S | 11/2019 | Wright | |
| 10,470,384 B1 | 11/2019 | Avery | |
| D919,341 S | 5/2021 | Li | |
| D928,528 S | 8/2021 | Liu | |
| D946,923 S | 3/2022 | Larkins | |
| 11,350,574 B2 | 6/2022 | Larkins | |
| 11,597,591 B2 * | 3/2023 | Larkins | A47B 47/02 |
| 11,765,996 B2 * | 9/2023 | Larkins | A01F 25/12 211/35 |
| 11,871,704 B2 * | 1/2024 | Larkins | F16M 11/00 |
| 11,910,758 B2 * | 2/2024 | Larkins | A01F 25/12 |
| 11,930,929 B2 * | 3/2024 | Larkins | A01F 25/12 |
| 2002/0184799 A1 | 12/2002 | Chou | |
| 2004/0226971 A1 | 11/2004 | Detten | |
| 2005/0035159 A1 | 2/2005 | Hunt et al. | |
| 2005/0109723 A1 | 5/2005 | Czerwinski | |
| 2005/0139625 A1 | 6/2005 | Gouldson | |
| 2005/0189383 A1 | 9/2005 | Weal et al. | |
| 2006/0032130 A1 | 2/2006 | Liffers et al. | |
| 2006/0091096 A1 | 5/2006 | Velez et al. | |
| 2006/0226179 A1 | 10/2006 | Hsu | |
| 2007/0062899 A1 * | 3/2007 | Royalty | B65D 19/08 211/151 |
| 2007/0246434 A1 * | 10/2007 | Adams | A47F 5/01 211/8 |
| 2007/0266627 A1 | 11/2007 | Shelton | |
| 2008/0217276 A1 * | 9/2008 | Brady | B65D 19/12 211/195 |
| 2008/0236041 A1 | 10/2008 | Carpenter | |
| 2008/0283558 A1 | 11/2008 | Rude et al. | |
| 2011/0247185 A1 | 10/2011 | Bolden et al. | |
| 2011/0284597 A1 | 11/2011 | Kaleta et al. | |
| 2012/0112425 A1 | 5/2012 | Hickey | |
| 2012/0132679 A1 | 5/2012 | Gouldson | |
| 2013/0015215 A1 | 1/2013 | Coote | |
| 2013/0221041 A1 | 8/2013 | Wittenstein et al. | |
| 2014/0246464 A1 | 9/2014 | Zhong | |
| 2014/0367425 A1 | 12/2014 | Laibe | |
| 2015/0075129 A1 | 3/2015 | Mooneyhan | |
| 2015/0230632 A1 | 8/2015 | Cantwell | |
| 2015/0257530 A1 * | 9/2015 | Naka | A47B 47/005 211/188 |
| 2016/0058210 A1 | 3/2016 | Strassburger et al. | |
| 2016/0223137 A1 | 8/2016 | Ochipa | |
| 2017/0105362 A1 | 4/2017 | Irving, Jr. | |
| 2017/0238731 A1 | 8/2017 | Davies | |
| 2017/0325614 A1 | 11/2017 | Baltz | |
| 2018/0087293 A1 | 3/2018 | Strassburger et al. | |
| 2018/0103785 A1 | 4/2018 | Goldman et al. | |
| 2018/0160833 A1 | 6/2018 | Ho | |
| 2018/0303263 A1 | 10/2018 | Jones et al. | |
| 2018/0317685 A1 | 11/2018 | Boles | |
| 2018/0325299 A1 | 11/2018 | Clark et al. | |
| 2018/0356028 A1 | 12/2018 | Fang | |
| 2019/0014936 A1 | 1/2019 | Beyda et al. | |
| 2019/0270466 A1 | 9/2019 | Flow | |
| 2019/0297781 A1 * | 10/2019 | Palmer | F26B 9/10 |
| 2019/0307264 A1 | 10/2019 | Carr et al. | |
| 2019/0380522 A1 | 12/2019 | Johansson | |
| 2020/0085221 A1 | 3/2020 | Riedel et al. | |
| 2020/0128988 A1 | 4/2020 | Moore et al. | |
| 2020/0245796 A1 | 8/2020 | Gilbert | |
| 2021/0094756 A1 * | 4/2021 | Larkins | A47B 96/14 |
| 2021/0105949 A1 | 4/2021 | Larkins | |
| 2022/0110264 A1 | 4/2022 | Larkins | |
| 2022/0279928 A1 | 9/2022 | Larkins | |
| 2022/0295711 A1 | 9/2022 | Larkins | |
| 2022/0312965 A1 * | 10/2022 | Larkins | A47B 96/06 |
| 2024/0016097 A1 * | 1/2024 | Larkins | A47B 47/0083 |

FOREIGN PATENT DOCUMENTS

| | | |
|---|---|---|
| CN | 104621238 A | 5/2015 |
| CN | 105474854 A | 4/2016 |
| CN | 205667333 U | 11/2016 |
| CN | 206611910 U | 11/2017 |
| CN | 107896731 A | 4/2018 |
| CN | 208864010 U | 5/2019 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |

(56) References Cited

FOREIGN PATENT DOCUMENTS

KR          101938225 B1    1/2019
WO          2018150157 A1   8/2018

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happymothering.com/diy-ha nging-herb-dryer/.

International Search Report and Written Opinion for Application No. PCT/US2020/042261 dated Nov. 2, 2020.

International Search Report and Written Opinion issued in corresponding International Application No. PCT/US2020/053426 dated Jan. 18, 2021, 14 pages.

International Search Report and Written Opinion issued in corresponding International Application No. PCT/US2020/054898 dated Jan. 22, 2021, 14 pages.

International Preliminary Report on Patentability issued in corresponding international application No. PCT/US2020/053426, dated Apr. 5, 2022, 6 pages.

Canadian Office Action dated Jan. 29, 2024 issued in Canadian Patent Application No. 3,151,193 (6 pages).

European Examination Report issued by the European Patent Office in connection with International Application No. 20 751 012.4, dated Oct. 14, 2024.

International Preliminary Report on Patentability and Written Opinion dated Apr. 12, 2022, issued in corresponding international application No. PCT/US2020/054898, 7 pages.

Chinese Office Action issued by the State Intellectual Property Office of People's Republic of China in connection with International Application No. 2020800064670.3, pp. 1-7, dated Mar. 1, 2023.

Chinese Office Action issued by the State Intellectual Property Office of People's Republic of China in connection with International Application No. 2020800064670.3, pp. 1-3, dated Oct. 10, 2023.

Canadian Examiners Report issued by the Canadian Patent Office in connection with International Application No. 3,147,595, dated Oct. 26, 2023.

Canadian Examination Report issued in related Canadian Patent Application No. 3,155,364 dated Nov. 3, 2023 (5 pages).

Chinese Decision of Rejection issued by the Chinese Patent Office in connection with International Application No. 202080064670.3, pp. 1-12, dated Feb. 23, 2024.

\* cited by examiner

SYSTEM FOR HANG HARVESTING VEGETATION

CROSS-REFERENCE TO RELATED APPLICATION

This application a non-provisional application claiming the benefit of and priority to U.S. patent application Ser. No. 17/691,462, filed on Mar. 10, 2022, issued as U.S. Pat. No. 11,765,996 on Sep. 26, 2023, claiming priority to U.S. Provisional Patent Application No. 63/161,599, filed on Mar. 16, 2021, the entire contents of which being incorporated by reference herein.

BACKGROUND

Recently there has been a widespread growth of the use of cannabis and hemp ranging from medicine to recreational. In this widespread growth, the drying of cannabis and hemp has become an essential part of the processing cannabis and hemp, but the process takes significant amount of time and effort. Typically, the drying process requires the hemp and/or cannabis to be hung with plastic netting, which is not only time-consuming but requires a lot of manual labor and leaves little room for error. The process requires the hemp and/or cannabis to be hung one branch at time and threaded through the netting to secure the hemp and/or cannabis. Removal of the hemp and/or cannabis requires careful unthreading of the hemp and/or cannabis from the plastic netting.

Additionally, from harvest to drying the hemp and/or cannabis is contacted frequently, which diminishes the quality of the finished dried product. Therefore, there is a need to provide an efficient and easy to use system and method of hanging and drying vegetation, such as, hemp, cannabis, and other plants harvested and subsequently dried, without damaging the vegetation.

SUMMARY

In an aspect of the present disclosure, a stackable hang harvesting system for hanging vegetation is provided and includes a first pod having a platform and a plurality of vertical support shafts. The platform has a plurality of feet extending from a bottom side thereof. The feet define a recess configured to receive a respective support shaft of a second pod. The vertical support shafts have a bottom end configured to couple to a top side of the platform, and a top end configured to support a third pod thereon. Each of the vertical support shafts defines a plurality of notches spaced from one another along a length of the vertical support shaft. The notches are configured to receive a corresponding end portion of a horizontal support bar.

In aspects, each notch may be defined in a lateral side of the respective vertical support shaft.

In aspects, each notch may be configured to prevent lateral movement of the horizontal support bar therein while allowing for sliding movement of the horizontal support bar along a longitudinal axis of the horizontal support bar.

In aspects, each notch may have a first portion extending inwardly from the lateral side of the vertical support shaft and having a height approximating a height of the horizontal support bar to allow for a lateral insertion of the horizontal support bar into the notch. Each notch may further include a second portion extending downwardly from the first portion and having a width approximating a width of the horizontal support bar to prevent lateral movement of the horizontal support bar when the horizontal support bar is received in the second portion.

In aspects, the platform may have four corners, and the bottom end of each of the vertical support shafts may be coupled to the platform adjacent a respective corner of the four corners.

In aspects, the platform may have a pair of brackets extending from the bottom side of the platform. The brackets are configured for receipt of a pair of forks of a lift truck.

In aspects, the stackable hang harvesting system may further include a vegetation hanger including a crossbar configured for supporting vegetation thereon. The vegetation hanger may define an aperture configured for receipt of the horizontal support bar.

In accordance with another aspect of the present disclosure, a stackable hang harvesting system for hanging vegetation is provided that includes a plurality of horizontal support shafts each having a first end portion and an opposite second end portion, a first pod, and a second pod. The first pod includes a platform having a bottom side and a top side, a first vertical support shat, a second vertical support shaft, a third vertical support shaft, and a fourth vertical support shaft. Each of the vertical support shafts has a bottom end configured to couple to the top side of the platform adjacent a respective corner of the platform. Each of the vertical support shafts defines a plurality of notches spaced from one another along a length of the vertical support shaft. A first notch of the first vertical support shaft is configured to receive the first end portion of a first horizontal support bar and a first notch of the second vertical support shaft is configured to receive the second end portion of the first horizontal support bar. The second pod includes a platform having a bottom side and a top side, and a plurality of vertical support shafts each having a bottom end configured to couple to the top side of the platform of the second pod adjacent a respective corner of the platform. Each of the vertical support shafts of the second pod defines a plurality of notches spaced from one another along a length of the vertical support shaft.

In aspects, the bottom side of the platform of the second pod may be configured to be supported on the top end of the vertical support shafts of the first pod.

In aspects, the platform of the second pod may have a plurality of feet extending from the bottom side thereof. The feet may each define a recess configured to receive the top end of the respective vertical support shaft of the first pod.

In aspects, each notch may be defined in a lateral side of the respective vertical support shaft of the first pod.

In aspects, the first notches of the first and second vertical support shafts may be configured to prevent lateral movement of the first horizontal support bar therein while allow for sliding movement of the first horizontal support bar along a longitudinal axis of the first horizontal support bar.

In aspects, the first notches of the first and second vertical support shafts may each have a first portion extending inwardly from the lateral side of the respective first and second vertical support shafts and have a height approximating a height of the first horizontal support bar to allow for a lateral insertion of the first horizontal support bar into the first notches. The first notches of the first and second vertical support shafts may each have a second portion extending downwardly from the first portion and having a width approximating a width of the first horizontal support bar to prevent lateral movement of the first horizontal bar when the first horizontal support bar is received in the second portion.

In aspects, the platform of the first pod may have a pair of brackets extending from the bottom side of the platform. The brackets are configured for receipt of a pair of forks of a lift truck.

In aspects, the stackable hang harvesting system may further include a vegetation hanger including a crossbar configured for supporting vegetation thereon. The vegetation hanger may define an aperture configured for receipt of the first horizontal support bar.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Embodiments of the presently disclosed system are described in detail with reference to the drawings, in which like reference numerals designate identical or corresponding elements in each of the several views, wherein.

DETAILED DESCRIPTION

As will be described in detail below, the present disclosure is directed to a stackable vegetation hang harvesting system that can be easily assembled and disassembled using a lift truck. The system includes a plurality of individual pods that are configured to be stacked vertically with each including a platform and vertical supports shafts extending upwardly from platform. The vertical support shafts each define a plurality of notches spaced along a length of the respective shaft. Notches of adjacent shafts that are level with one another receive opposing end portions of a horizontal support bar to suspend the horizontal support bar. A plurality of horizontal support bars may be stacked vertically along the height of the vertical support shafts. Vegetation hangers may be hung from each of the horizontal support bars and spaced from one another along the horizontal axis to allow for vegetation (e.g., cannabis) to be hung from the vegetation hangers.

Figure 1:
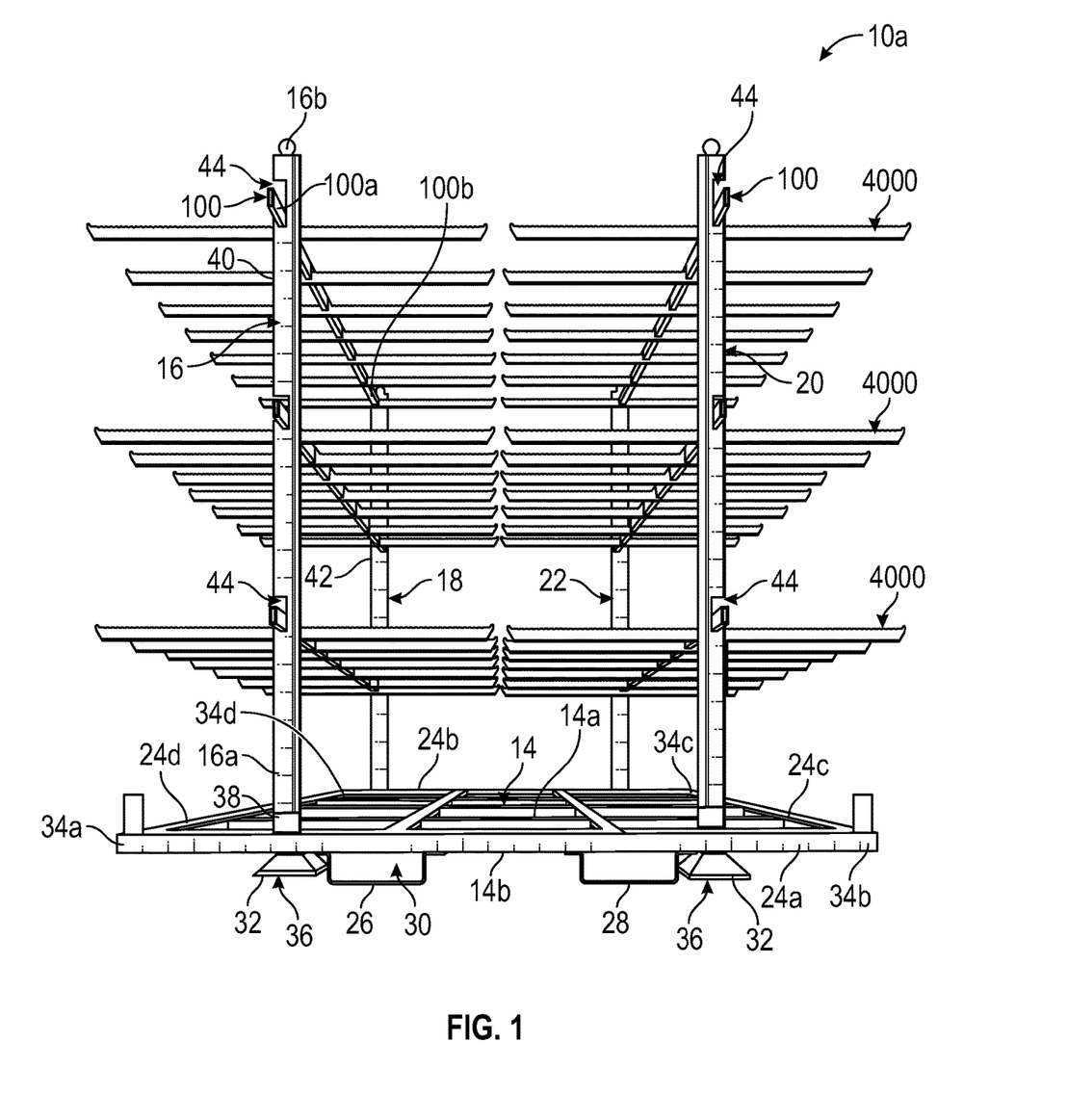
FIG. 1 is a front perspective view of a first pod of a hang harvesting system in accordance with the present disclosure.
Figure 2:
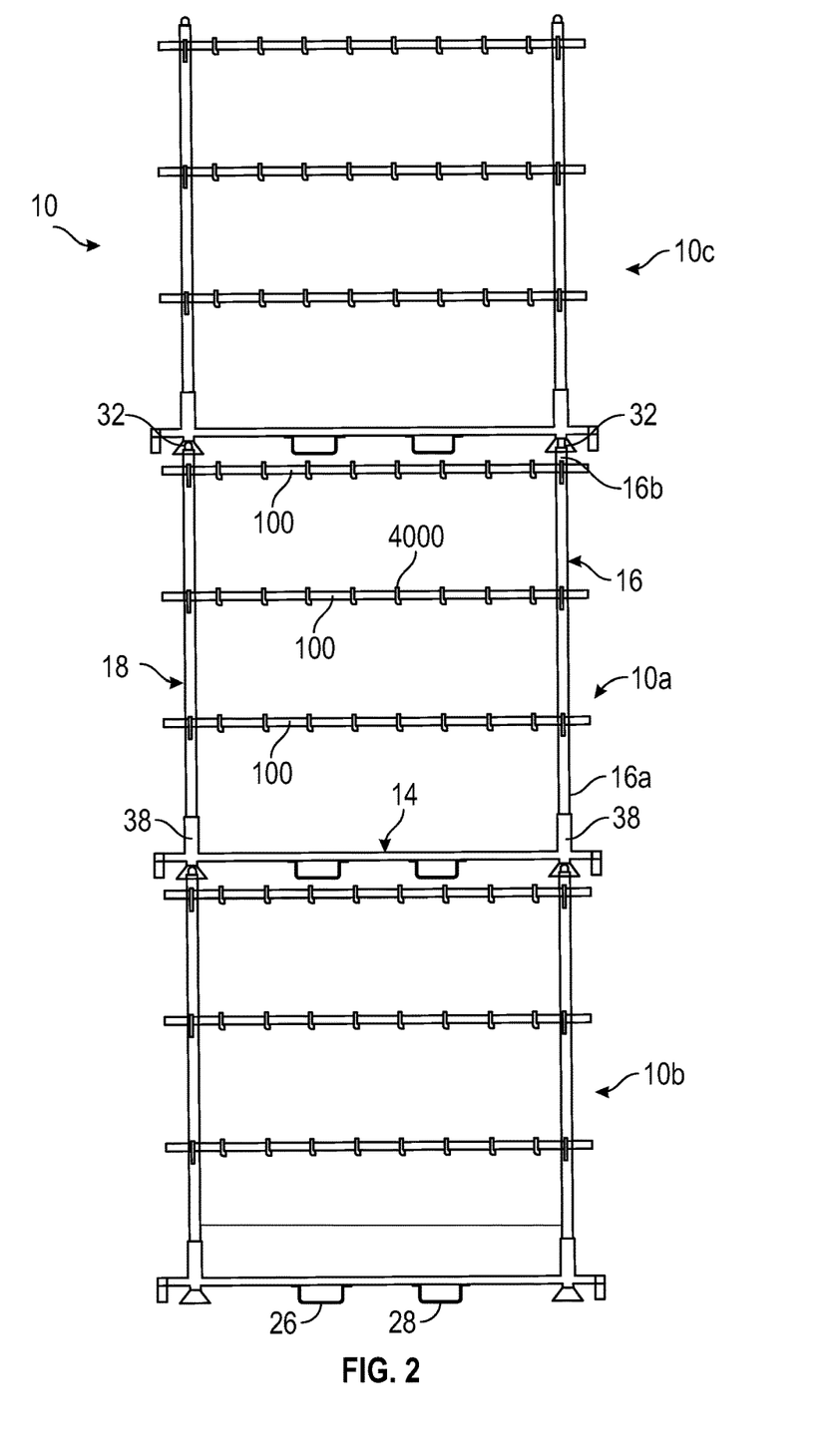
FIG. 2 is a side view of the hang harvesting system including the first pod of FIG. 1 and second and third pods positioned above and below the first pod.
Figure 3:
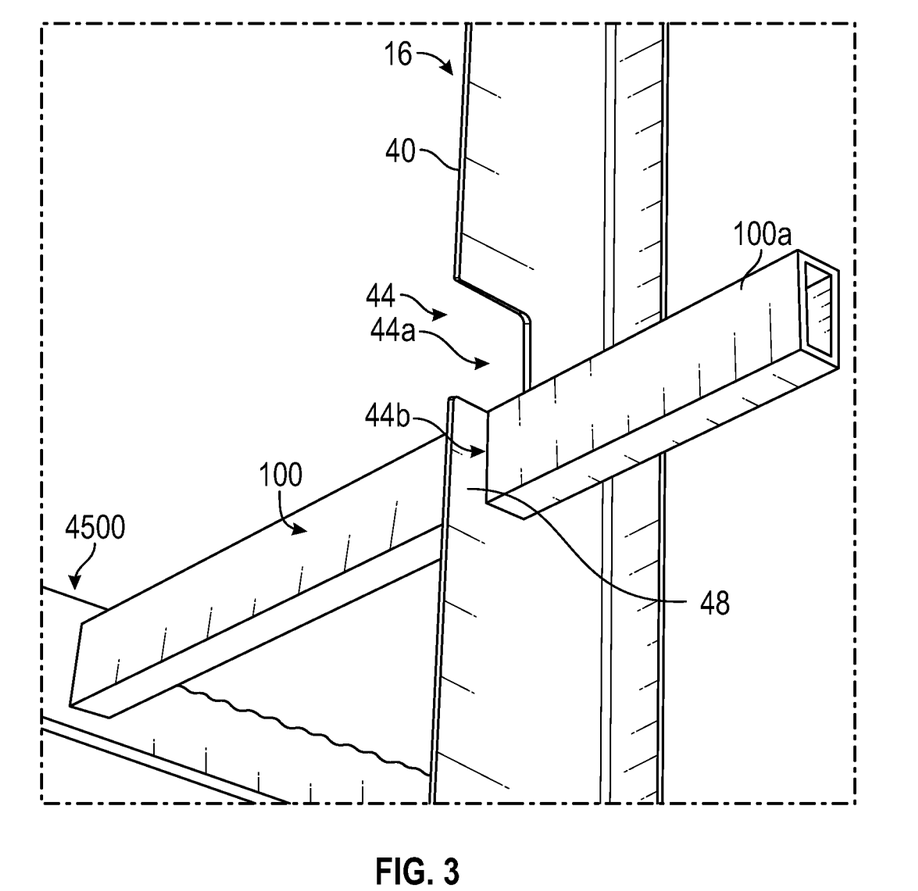
FIG. 3 is an enlarged perspective view illustrating a horizontal support bar received within a notch of a vertical support bar of the first pod of FIG. 1.

Referring now to FIGS. 1-3, a vegetation hang harvesting system 10 generally includes a plurality of stackable assemblies, such as, for example, first, second, and third pods 10a, 10b, 10c; a plurality of horizontal support bars 100 configured to be supported on the pods 10a, 10b, 10c; and a plurality of vegetation hangers 4000 (FIGS. 5-7) and 4500 (FIGS. 8 and 9) configured to be arranged on the horizontal support bars 100. Since each of the first, second, and third pods 10a, 10b, 10c are substantially similar or identical, only the first pod 10a will be described in detail.

The first pod 10a includes a base or platform 14 and a plurality of vertical support shafts 16, 18, 20, 22 configured to be detachably coupled to the platform 14. The platform 14 has a top side 14a, an opposite bottom side 14b, and may assume a planar, square or rectangular shape. It is contemplated that the platform 14 may assume other suitable shapes. The platform 14 has opposing first and second parallel outer sides 24a, 24b, and opposing third and fourth parallel outer sides 24c, 24d together giving the platform 14 its square shape. The first outer side 24a may have a pair of brackets 26, 28 extending from the bottom side 14b thereof. It is contemplated that each of the outer sides 24b, 24c, 24d may also have a pair of brackets (not explicitly labeled) extending from the bottom side 14b thereof. The brackets 26, 28 are spaced from one another along the length of the first outer side 24a and each define a substantially rectangular opening 30 configured for receipt of a pair of forks of a lift truck to facilitate lifting and transport of the first pod 10a using a lift truck.

The bottom side 14b of the platform further includes a plurality of feet 32 extending downwardly therefrom and positioned adjacent the respective four corners 34a, 34b, 34c, 34d of the platform 14. Each of the feet 32 may have a square frustrum shape configured to support the platform 14 at an elevation from the ground when the first pod 10a is seated on the ground. Other shapes fort the feet 32 are also contemplated. The feet 32 each define a recess 36 therein configured to receive top ends of respective vertical support shafts of the second pod 10b, as will be described in further detail below.

The top side 14b of the platform 14 includes a plurality of cups 38 extending upwardly therefrom. The cups 38 are colinear with and positioned above the respective feet 32. Each of the cups 38 may have a rectangular shape and are configured for receipt of a bottom end 16a of each of the respective vertical support shafts 16, 18, 20, 22 of the first pod 10. It is contemplated that the bottom end 16a of the vertical support shafts 16, 18, 20, 22 may have a non-circular cross-sectional shape, such as, for example, square, such that upon receipt thereof in the respective cups 38, rotation of the vertical support shafts 16, 18, 20, 22 relative to the cups 38 is prohibited.

Each of the vertical support shafts 16, 18, 20, 22 is configured to extend perpendicularly relative to the platform 14 upon the bottom ends 16a thereof being received in the cups 38 of the platform 14. Since vertical support shafts 16, 18, 20, 22 are substantially similar or identical, only vertical support shaft 16 will be described in detail. The vertical support shaft 16 remains upright and is prevented from tilting relative to the platform 14 due to the mating engagement of the bottom end 16a of the vertical support shaft 16 within the cup 38. The vertical support shaft 16 has a top end 16b having a male mating part configured to detachably secure to a corresponding female mating part of the third pod 10c.

The first and second vertical support shafts 16, 18 are configured to be positioned on the first and second outer sides 24a, 24b of the platform 14, respectively. The first and second vertical support shafts 16, 18 each have lateral sides 40, 42 that face away from one another when the first and second vertical support shafts 16, 18 are assembled to the platform 14. The lateral sides 40, 42 of the first and second vertical support shafts 16, 18 define a plurality of notches 44 therein that are spaced from one another along a length of the first and second vertical support shafts 16, 18, respectively. In aspects, each of the vertical support shafts 16, 18, 20, 22 may have three notches 44 that are spaced a selected distance from one another along the length of the respective vertical support shafts 16, 18, 20, 22. In other aspects, more or less than three notches 44 are formed in the vertical support shafts 16, 18, 20, 22. Each of the plurality of notches 44 is configured to receive a corresponding end portion 100*a* or 100*b* of the horizontal support bar 100.

As best shown in FIG. 3, each notch 44 has a first portion 44*a* extending inwardly from the lateral side 40 of the vertical support shaft 16, and a second portion 44*b* extending downwardly from the first portion 44*a*. The first portion 44*a* of the notch 44 has a height approximating a height of the horizontal support bar 100 to allow for a lateral insertion of the horizontal support bar 100 into the notch 44. The second portion 44*b* of the notch 44 has a width approximating a width of the horizontal support bar 100 to prevent lateral movement of the horizontal support bar 100 when the horizontal support bar 100 is received in the second portion 44*b*. The lateral side 40 of the vertical support shaft 16 has an upright finger 48 configured to capture the horizontal support bar 100 in the second portion 44*b* to prevent lateral removal of the horizontal support bar 100 from the notch 44. The notches 44 are configured to prevent lateral movement of the horizontal support bar 100 therein while allowing for sliding movement of the horizontal support bar 100 along a longitudinal axis of the horizontal support bar 100.

In aspects, rather than the notches 44 being formed in the vertical support shafts 16, 18, 20, 22, brackets (not explicitly labeled) may be provided that are configured to attach to the vertical support shafts 16, 18, 20, 22 and which have the respective notches 44 formed therein.

In operation, the system 10 is deployed at the point of harvest. For each of the first, second, and third pods 10*a*, 10*b*, 10*c*, the bottom ends 16*a* of the vertical support shafts 16, 18, 20, 22 are received within the corresponding cups 38 of the platform 14, whereby the pods 10*a*, 10*b*, 10*c* are assembled. The horizontal support bars 100 are received within the corresponding notches 44 such that the horizontal support bars 100 that are positioned on the first and second vertical support shafts 16, 18 are arranged parallel with one another and vertically distanced from one another, and the horizontal support bars 100 that are positioned on the third and fourth vertical support shafts 20, 22 are arranged parallel with one another and vertically distanced from one another and horizontally distanced from the horizontal support bars 100 that are on the first and second vertical support shafts 16, 18. With the horizontal support bars 100 being positioned in the notches 44, the vegetation hangers 4000 or 4500 may be hung from each of the horizontal support bars 100. Vegetation may be cut to a predetermined length, such as, for example 36 inches. Then, the cut vegetation is hung, at the point of harvest, over the vegetation hangers 4000 or 4500.

With the second pod 10*b* positioned on the ground, forks of a lift truck may be positioned within the brackets 26, 28 of the first pod 10*a*. The first pod 10*a* is lifted above and placed onto the second pod 10*b* whereby the top ends 16*b* of the vertical support shafts 16, 18, 20, 22 of the second pod 10*b* are received in the recesses 36 (FIG. 1) of the feet 32 of the first pod 10*a* to stably stack the first pod 10*a* on the second pod 10*b*. The third pod 10*c* may be lifted above and placed onto the first pod 10*a* whereby the top ends 16*b* of the vertical support shafts 16, 18, 20, 22 of the first pod 10*a* are received in the recesses 36 of the feet 32 of the third pod 10*c* to stably stack the third pod 10*c* on the first pod 10*a*, as shown in FIG. 2. As such, the first, second, and third pods 10*a*, 10*b*, 10*c* are stacked vertically and assume a small footprint within a warehouse or other storage location.

The vegetation hangers 4000, 4500 may be easily transported by either lifting or sliding the vegetation hangers 4000, 4500 off of the horizontal support bars 100, or by removing the horizontal support bars 100 from the pods 10*a*, 10*b*, 10*c* to be hung at another location.

With reference to FIGS. 4-7, the vegetation hanger 4000 generally includes a hanger portion or handle portion 4100 and a cross bar portion 4200 coupled to the hanger portion 4100. The hanger portion 4100 has a first end portion 4100*a* and a second end portion 4100*b*. The hanger portion 4100 includes a first aperture 4105, a stem 4110, and a base 4115. The first aperture 4105 is disposed at the first end portion 4100*a* of the hanger portion 4100 and is configured to facilitate transporting, re-hanging, and handling of the vegetation hanger 3400 by a user without re-touching the vegetation, thus preserving the vegetation's condition. The first aperture 4105 may be dimensioned to receive a hand or one or more fingers of a user. The hanger portion 4100 may be fabricated from a lightweight metal, plastic, composite material, or any other suitable material. The first end portion 4100*a* may be dipped in a rubber composition, or any other suitable material to provide a comfortable grip using the first aperture.

Figure 4:
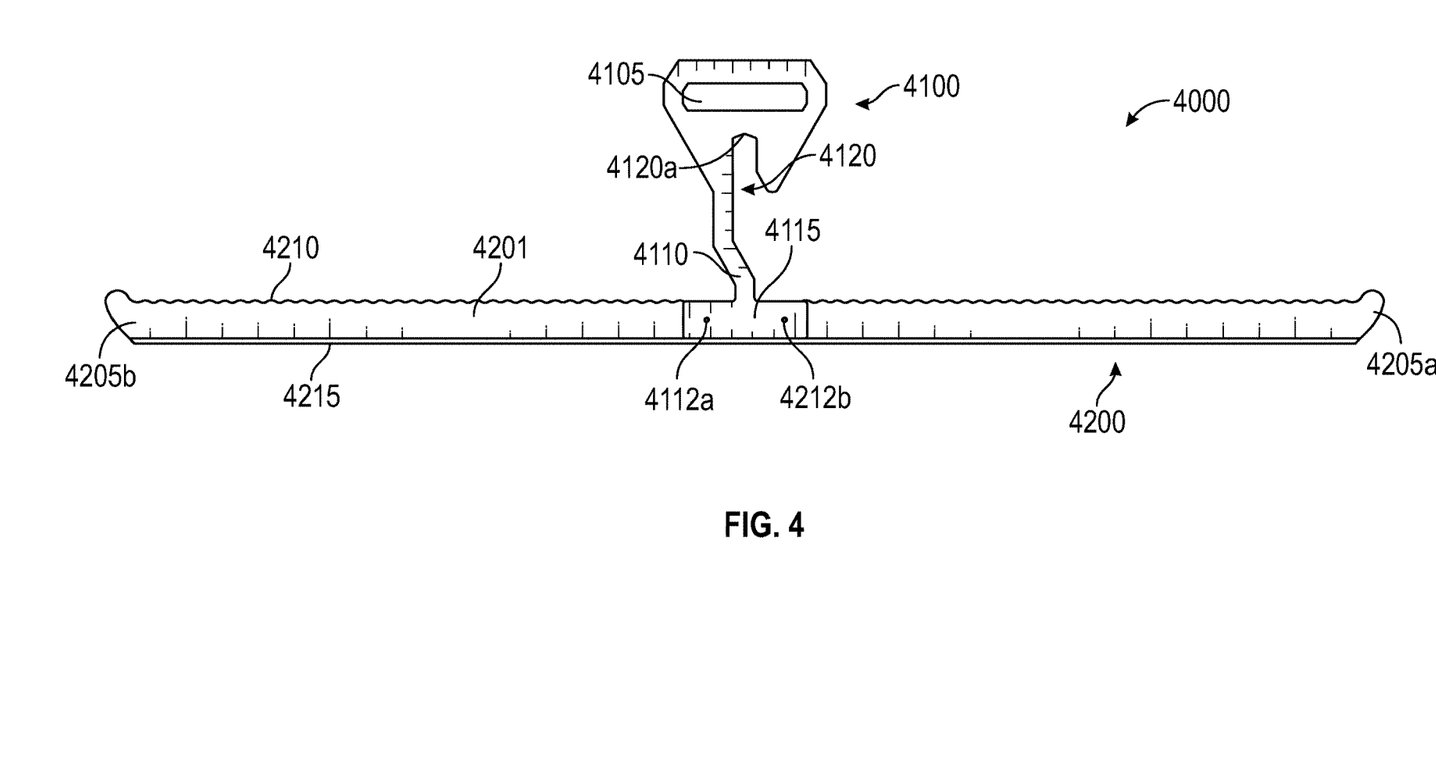
FIG. 4 is a front view illustrating a vegetation hanger of the hang harvesting system of FIG. 1.
Figure 5:
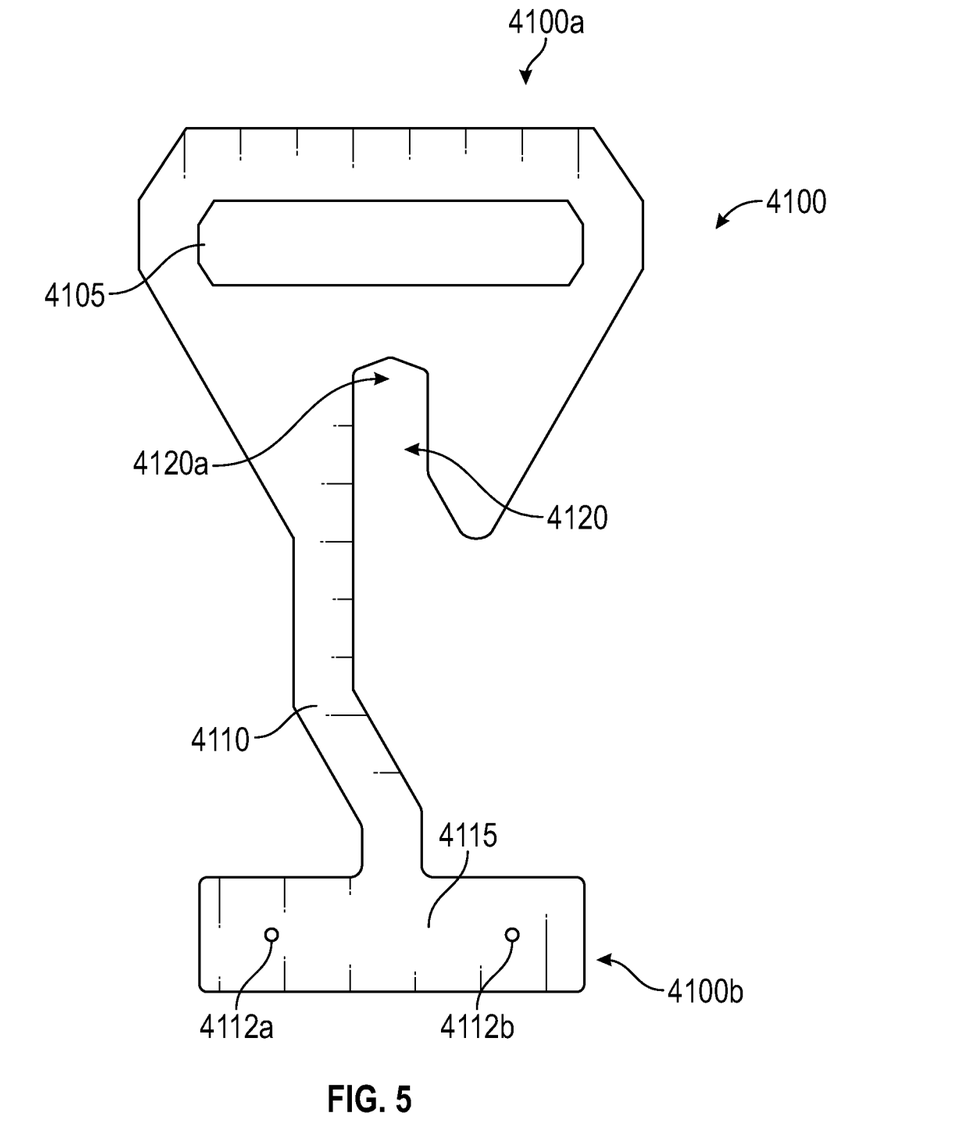
FIG. 5 is a front view illustrating a handle portion of the vegetation hanger of FIG. 4.

The stem 4110 extends the first end portion 4100*a* towards a second end portion 4100*b* defining a second aperture 4120. The second aperture 4120 is configured to facilitate hanging of the vegetation hanger 4000 on the horizontal hanging bar 3000. The second aperture 4120 is dimensioned to intimately engage the horizontal hanging bar 3000. As another example, the second aperture 4120 may have a top end portion that may include a V-shaped notch 4120*a* at the top of the second aperture 4120 to facilitate the use of the vegetation hanger 3000 on a rope or string.

The base 4115 of the hanger portion 4100 is disposed at the second end portion 4100*b* and may be coupled to the crossbar 4200. The base 4115 may be coupled to the crossbar 4200 by ultrasonic welding, magnets, adhesive, cord, or fasteners 4112*a*, 4112*b* as shown. The fasteners 4112*a*, 4112*b* may be bolts, screws, or any other suitable fastener. The base 4115 when coupled to the crossbar 4200 is dimensioned to be flush with the crossbar 4200.

Figure 6:
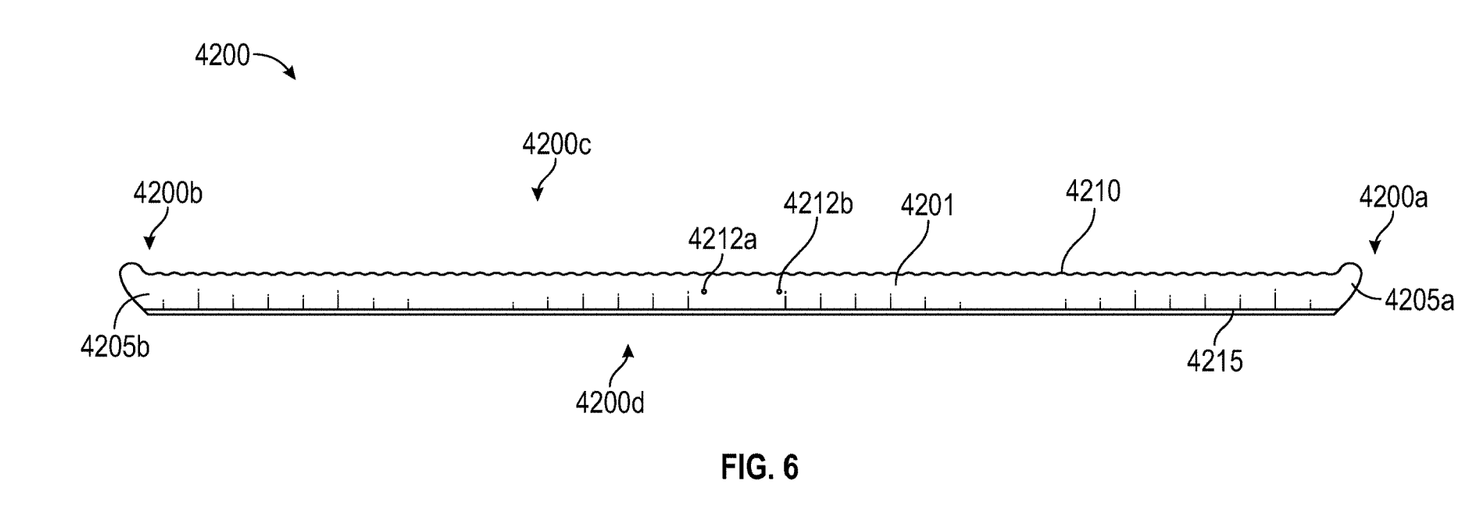
FIG. 6 is a front view of a crossbar of the vegetation hanger of FIG. 4.
Figure 7:
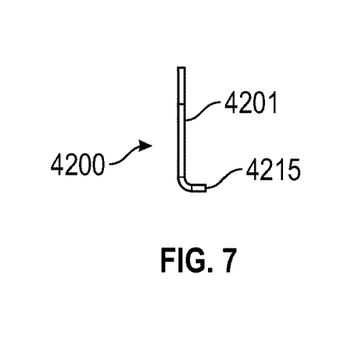
FIG. 7 is a side cross-sectional view of the crossbar of FIG. 6.

The crossbar 4200 includes a linear plate 4201 configured to facilitate the hanging of vegetation thereon. The linear plate 4201 includes a first end portion 4200*a* and second end portion 4200*b*, a top edge 4200*c*, and bottom edge 4200*d*. At least a portion of top edge 4200*c* of the linear plate 4201 includes at least one ridge, or alternatively as shown, serrated or textured surface including a series or plurality of ridges 4210, disposed along the top edge 4200*c*. The series of ridges are configured to prevent vegetation from sliding off the crossbar 4200 and provide organization of the vegetation on the series of ridges 4210. The linear plate 4201 may include openings 4212*a*, 4212*b* to receive the fasteners 4112*a*, 4112*b* to couple the crossbar 4200 to the hanging portion 4100. The linear plate 4201 includes one or more lips 4205*a*, 4205*b* disposed on the first and second end portions 4200*a*, 4200*b*, respectively. The lips 4205*a*, 4205*b* are configured to prevent further lateral movement of the vegetation off the first and second end portion 4200*a*, 4200*b*.

The bottom edge 4200*d* may be bent to a predetermined angle such as, for example, 90 degrees, relative to the linear plate 4201 to provide additional strength to the linear plate 4201 in carrying vegetation on the linear plate 4201.

The linear plate 4201 may be fabricated at any suitable length, which, as non-limiting examples, may be one of 21", 41", or 61" to accommodate different open spaces, amount of vegetation to be dried, and support of vegetation within a drying system. The crossbar 4200 may be fabricated from a lightweight metal, plastic, composite material, or any other suitable material. The vegetation hanger 4000 may be configured to be flat providing a minimal thickness to allow for stacking and storage of multiple vegetation hanger(s). The hanger portion 4100 and the crossbar 4200 may be fabricated into a single unit, instead of being two components coupled to one another.

Figure 8:
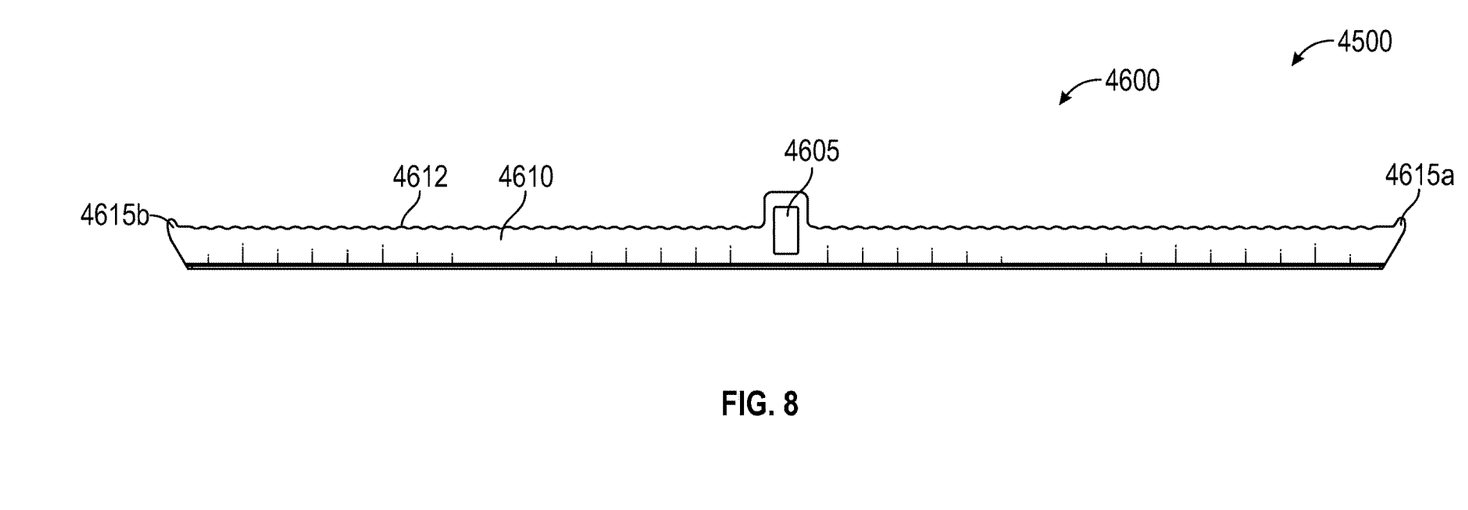
FIG. 8 is a front view illustrating another vegetation hanger of the hang harvesting system of FIG. 1.
Figure 9:
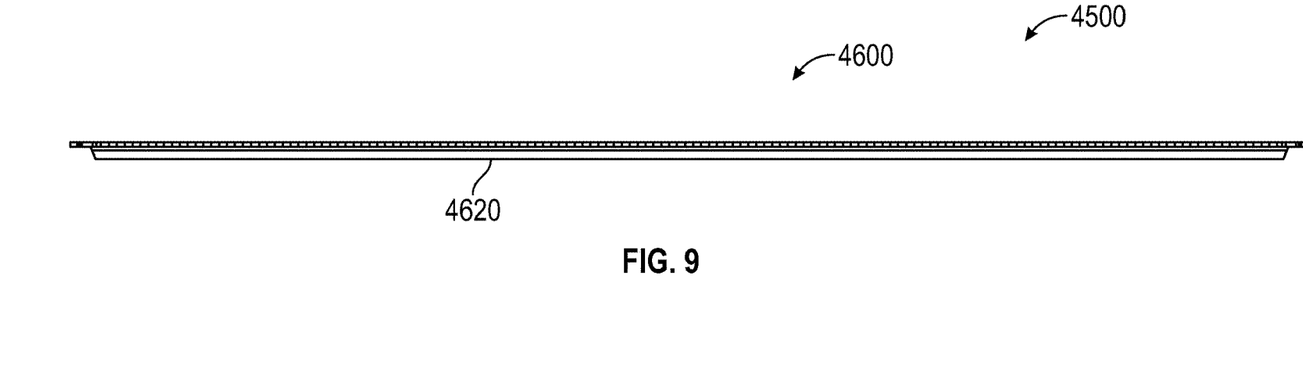
FIG. 9 is a top view illustrating the vegetation hanger of FIG. 8.

Referring to FIGS. 8 and 9, the vegetation hanger 4500 generally includes a crossbar 4600 having a linear portion 4610 and an aperture 4605. The aperture 4605 is disposed centrally along the linear portion 4610 and configured to slidably engage a pole or horizontal bar. The linear plate 4601 is configured to facilitate the hanging of vegetation thereon. The linear plate 4601 includes a first end portion 4600a and second end portion 4600b, a top edge 4600c, and bottom edge 4600d. At least a portion of top edge 4600c of the linear plate 4601 includes at least one ridge, or alternatively as shown, serrated or textured surface including a series or plurality of ridges 4612, disposed along the top edge 4600c. The series of ridges are configured to prevent vegetation from sliding off the crossbar 4600 and provide organization of the vegetation on the series of ridges 4612. The linear plate 4601 includes one or more lips 4615a, 4615b disposed on the first and second end portions 4600a, 4060b, respectively. The lips 4615a, 4615b are configured to prevent further lateral movement of the vegetation off the first and second end portion 4600a, 4600b. The crossbar 4600 may be fabricated from a lightweight powdered metal, plastic, composite material, or any other suitable material.

The bottom edge 4600d may be bent to a predetermined angle such as, for example, 90 degrees, relative to the linear plate 4601 to provide additional strength to the linear plate 4601 in carrying vegetation on the linear plate 4601.

The linear plate 4601 may be fabricated at any suitable length, which, as non-limiting examples, may be one of 21", 41", or 61" to accommodate different open spaces, amount of vegetation to be dried, and support of vegetation within a drying system. The vegetation hanger 4500 may be configured to be flat providing a minimal thickness to allow for stacking and storage of multiple vegetation hanger(s). Alternatively, the linear plate 4601 may be tapered in two directions from a center point between the first end portion 4600a and the second end portion 4600b outwardly towards each of the first end portion 4600a and the second end portion 4600b.

Persons skilled in the art will understand that the devices and methods specifically described herein and illustrated in the accompanying drawings are non-limiting exemplary embodiments. It is envisioned that the elements and features illustrated or described in connection with one exemplary embodiment may be combined with the elements and features of another without departing from the scope of the disclosure. As well, one skilled in the art will appreciate further features and advantages of the disclosure based on the above-described embodiments. Accordingly, the disclosure is not to be limited by what has been particularly shown and described, except as indicated by the appended claims.

What is claimed:

1. A stackable hang harvesting system for hanging vegetation, the stackable hang harvesting system comprising:
   a horizontal support bar; and
   a first pod including:
      a platform configured to receive a respective support shaft of a second pod on a bottom side thereof;
      a plurality of vertical support shafts each having a bottom end configured to couple to a top side of the platform, each of the plurality of vertical support shafts defining a plurality of notches configured to receive a corresponding end portion of the horizontal support bar, wherein the horizontal support bar maintains a same height and width throughout.

2. The stackable hang harvesting system according to claim 1, wherein the plurality of notches are spaced from one another along a length of the plurality of vertical support shafts, and wherein each notch of the plurality of notches is defined in a lateral side of a respective vertical support shaft.

3. The stackable hang harvesting system according to claim 2, wherein each notch of the plurality of notches is configured to prevent lateral movement of the horizontal support bar therein while allowing for sliding movement of the horizontal support bar along a longitudinal axis of the horizontal support bar.

4. The stackable hang harvesting system according to claim 2, wherein each notch of the plurality of notches has a first portion extending inwardly from the lateral side of the respective vertical support shaft and having a height approximating a height of the horizontal support bar to allow for a lateral insertion of the horizontal support bar into the notch, and a second portion extending downwardly from the first portion and having a width approximating a width of the horizontal support bar to prevent lateral movement of the horizontal support bar when the horizontal support bar is received in the second portion.

5. The stackable hang harvesting system according to claim 1, wherein the plurality of vertical support shafts each have a top end configured to support a third pod thereon.

6. The stackable hang harvesting system according to claim 5, wherein the platform has four corners, and the bottom end of each of the plurality of vertical support shafts is coupled to the platform adjacent a respective corner of the four corners.

7. The stackable hang harvesting system according to claim 6, wherein the platform includes:
   a plurality of feet extending from a bottom side thereof, the plurality of feet each defining a recess configured to receive the respective support shaft of the second pod; and
   a pair of brackets extending outwardly from the bottom side of the platform, wherein the pair of brackets is configured for receipt of a pair of forks of a lift truck.

8. The stackable hang harvesting system according to claim 7, wherein the top side of the platform includes a plurality of cups colinear with and positioned above the plurality of feet, and wherein each cup of the plurality of cups is configured to receive a corresponding bottom end of a vertical support shaft of the plurality of vertical support shafts.

9. The stackable hang harvesting system according to claim 1, further comprising a vegetation hanger including a crossbar configured for supporting vegetation thereon, wherein the vegetation hanger defines an aperture configured for receipt of the horizontal support bar.

10. The stackable hang harvesting system according to claim 1, wherein the corresponding end portion of the horizontal support bar extends through a notch of the plurality of notches and maintains a length spanning from an inner side to an outer side of a vertical support shaft of the plurality of vertical support shafts.

11. A stackable hang harvesting system for hanging vegetation, the stackable hang harvesting system comprising:

a plurality of horizontal support bars each having a first end portion and an opposite second end portion;

a first pod including:
   a platform having a bottom side and a top side;
   first, second, third, and fourth vertical support shafts each having a bottom end configured to couple to the top side of the platform, and a top end, each of the vertical support shafts defining a plurality of notches, wherein a first notch of the plurality of notches of the first vertical support shaft is configured to receive the first end portion of a first horizontal support bar of the plurality of horizontal support bars, and wherein the first horizontal support bar maintains a same height and width throughout; and a second pod including:
   a platform having a bottom side configured to be supported on the top end of the vertical support shafts of the first pod, and a top side; and
   a plurality of vertical support shafts each having a bottom end configured to couple to the top side of the platform of the second pod adjacent a respective corner of the platform, and a top end.

12. The stackable hang harvesting system for hanging vegetation according to claim 11, wherein the bottom end of each of the vertical support shafts of the first pod is configured to couple to the top side of the platform of the first pod adjacent a respective corner of the platform.

13. The stackable hang harvesting system according to claim 12, wherein the plurality of notches of each of the vertical support shafts are spaced from one another along a length of the vertical support shafts, and each notch of the plurality of notches is defined in a lateral side of the respective vertical support shaft of the first pod, and wherein a first notch of the plurality of notches of the second vertical support shaft is configured to receive a second end portion of the first horizontal support bar.

14. The stackable hang harvesting system according to claim 13, wherein first notches of the first and second vertical support shafts are configured to prevent lateral movement of the first horizontal support bar therein while allowing for sliding movement of the first horizontal support bar along a longitudinal axis of the first horizontal support bar.

15. The stackable hang harvesting system according to claim 13, wherein the first notches of the first and second vertical support shafts each have a first portion extending inwardly from the lateral side of the respective first and second vertical support shafts and have a height approximating a height of the first horizontal support bar to allow for a lateral insertion of the first horizontal support bar into the first notches, and a second portion extending downwardly from the first portion and having a width approximating a width of the first horizontal support bar to prevent lateral movement of the first horizontal bar when the first horizontal support bar is received in the second portion.

16. The stackable hang harvesting system according to claim 12, wherein the platform of the first pod includes:
   a pair of brackets extending outwardly from the bottom side of the platform, the pair of brackets being configured for receipt of a pair of forks of a lift truck.

17. The stackable hang harvesting system according to claim 12, further comprising a vegetation hanger including a crossbar configured for supporting vegetation thereon, wherein the vegetation hanger defines an aperture configured for receipt of the first horizontal support bar.

18. The stackable hang harvesting system for hanging vegetation according to claim 11, wherein the platform of the second pod has a plurality of feet extending from the bottom side thereof, the plurality of feet each defining a recess configured to receive the top end of the respective vertical support shaft of the first pod.

\* \* \* \* \*